US012621651B2

(12) United States Patent
Lang et al.

(10) Patent No.: US 12,621,651 B2
(45) Date of Patent: May 5, 2026

(54) DECENTRALIZED NETWORK REWARD DATA USAGE TRACKING

(71) Applicants:AT&T Intellectual Property I, L.P., Atlanta, GA (US); AT&T Mobility II LLC, Atlanta, GA (US)

(72) Inventors: Howard Lang, Wayside, NJ (US); Jasminka Dizdarevic, Austin, TX (US); Willem DuPlessis, Parkland, FL (US); Joseph Soryal, Glendale, NY (US); Nicholas Thompson, Lake In The Hills, IL (US); Marcus Thor, Oak Harbor, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 680 days.

(21) Appl. No.: 18/062,914

(22) Filed: Dec. 7, 2022

(65) Prior Publication Data

US 2023/0403549 A1     Dec. 14, 2023

Related U.S. Application Data

(60) Provisional application No. 63/351,154, filed on Jun. 10, 2022.

(51) Int. Cl.
*H04W 8/20*          (2009.01)
(52) U.S. Cl.
CPC ..................................... *H04W 8/20* (2013.01)
(58) Field of Classification Search
CPC ..................................................... H04W 8/20
See application file for complete search history.

(56) References Cited

U.S. PATENT DOCUMENTS 10,374,908 B2 *  8/2019  Mihály ............... H04L 41/5029
10,803,418 B2 *  10/2020  Ng ........................ H04L 63/083
(Continued)

FOREIGN PATENT DOCUMENTS

WO     WO-2009140438 A1 *  11/2009  ......... G06Q 20/1235
WO     WO-2013048381 A1 *  4/2013  ............. H04L 43/16

*Primary Examiner* — Matthew D. Anderson
*Assistant Examiner* — Michele C Douglas
(74) *Attorney, Agent, or Firm* — Guntin & Gust, PLC; Miyoung Shin

(57) ABSTRACT

Aspects of the subject disclosure may include, for example, a device comprising: a processing system including a processor; and a memory that stores executable instructions that, when executed by the processing system, facilitate performance of operations, the operations comprising: receiving, based upon a first communication between first user equipment and a first wireless network, a first temporary identifier of the first user equipment; correlating the first temporary identifier to a first permanent identifier of the first user equipment; tracking a first amount of data that is carried by the first wireless network and that is associated with the first user equipment, resulting in first tracked data usage, wherein the tracking is based upon the correlating of the first temporary identifier to the first permanent identifier; determining whether the first tracked data usage exceeds a first threshold, resulting in a first determination; and responsive to the first determination being that the first tracked data usage does not exceed the first threshold, providing a first reward to a first operator of the first wireless network. Other embodiments are disclosed.

20 Claims, 11 Drawing Sheets

(56)             References Cited

U.S. PATENT DOCUMENTS

| | | | |
|---|---|---|---|
| 2013/0132854 A1* | 5/2013 | Raleigh | G06F 3/0482 |
| | | | 715/738 |
| 2014/0254579 A1* | 9/2014 | Huber | H04W 4/40 |
| | | | 370/338 |
| 2016/0353351 A1* | 12/2016 | Huber | H04W 8/22 |
| 2017/0039242 A1* | 2/2017 | Milton | H04W 4/02 |
| 2018/0316764 A1* | 11/2018 | Ferreira Gomes | G07C 5/02 |
| 2018/0368100 A1* | 12/2018 | Kasirajan | H04W 8/02 |
| 2019/0158469 A1* | 5/2019 | Gonzalez | H04L 63/0428 |
| 2019/0274110 A1* | 9/2019 | Luft | H04L 63/0884 |
| 2021/0274412 A1* | 9/2021 | Dowlatkhah | H04B 7/18523 |
| 2021/0302167 A1* | 9/2021 | Crolley | G01S 19/45 |
| 2021/0357907 A1* | 11/2021 | Shpak | H04W 4/029 |
| 2022/0024494 A1* | 1/2022 | Bonanni | G01C 21/3453 |
| 2022/0131871 A1* | 4/2022 | Huang | G06F 16/22 |
| 2022/0139167 A1* | 5/2022 | Weaver | G07F 17/3276 |
| | | | 463/19 |

* cited by examiner

100

200

250

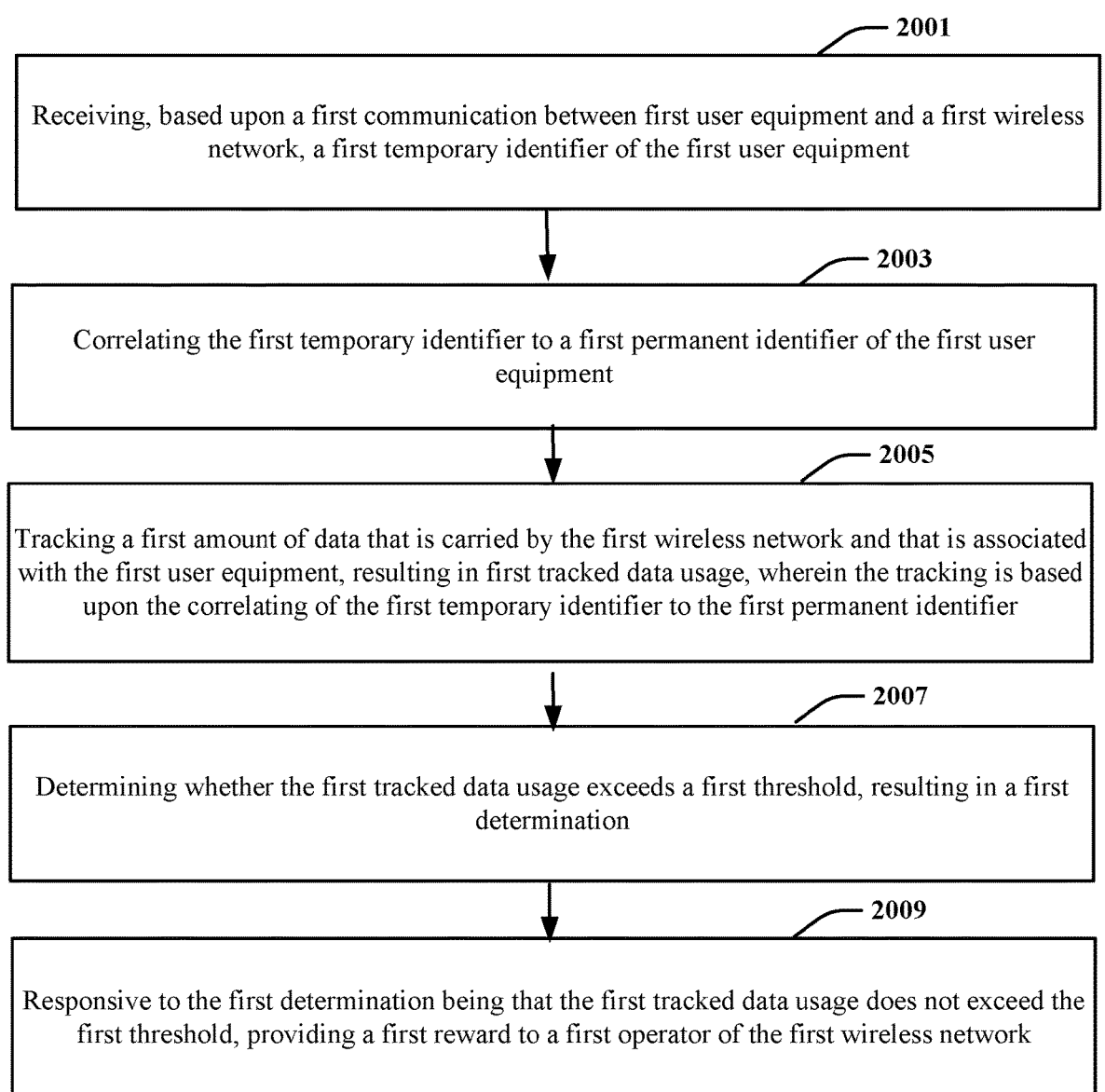

Receiving, based upon a first communication between first user equipment and a first wireless network, a first temporary identifier of the first user equipment — 2001

Correlating the first temporary identifier to a first permanent identifier of the first user equipment — 2003

Tracking a first amount of data that is carried by the first wireless network and that is associated with the first user equipment, resulting in first tracked data usage, wherein the tracking is based upon the correlating of the first temporary identifier to the first permanent identifier — 2005

Determining whether the first tracked data usage exceeds a first threshold, resulting in a first determination — 2007

Responsive to the first determination being that the first tracked data usage does not exceed the first threshold, providing a first reward to a first operator of the first wireless network — 2009

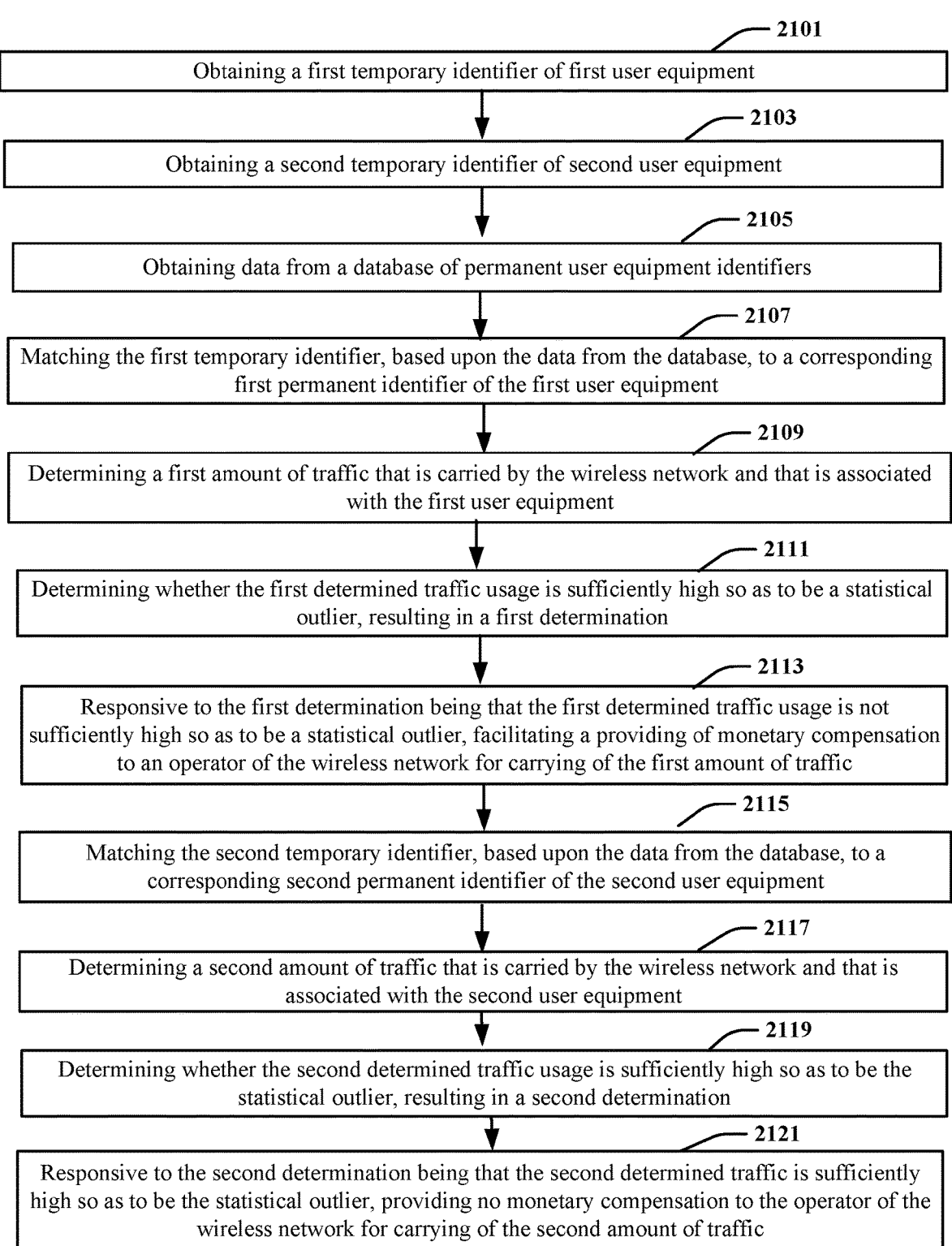

2101
Obtaining a first temporary identifier of first user equipment

2103
Obtaining a second temporary identifier of second user equipment

2105
Obtaining data from a database of permanent user equipment identifiers

2107
Matching the first temporary identifier, based upon the data from the database, to a corresponding first permanent identifier of the first user equipment 2109
Determining a first amount of traffic that is carried by the wireless network and that is associated with the first user equipment 2111
Determining whether the first determined traffic usage is sufficiently high so as to be a statistical outlier, resulting in a first determination 2113
Responsive to the first determination being that the first determined traffic usage is not sufficiently high so as to be a statistical outlier, facilitating a providing of monetary compensation to an operator of the wireless network for carrying of the first amount of traffic 2115
Matching the second temporary identifier, based upon the data from the database, to a corresponding second permanent identifier of the second user equipment 2117
Determining a second amount of traffic that is carried by the wireless network and that is associated with the second user equipment 2119
Determining whether the second determined traffic usage is sufficiently high so as to be the statistical outlier, resulting in a second determination 2121
Responsive to the second determination being that the second determined traffic is sufficiently high so as to be the statistical outlier, providing no monetary compensation to the operator of the wireless network for carrying of the second amount of traffic

FIG. 2D        2100

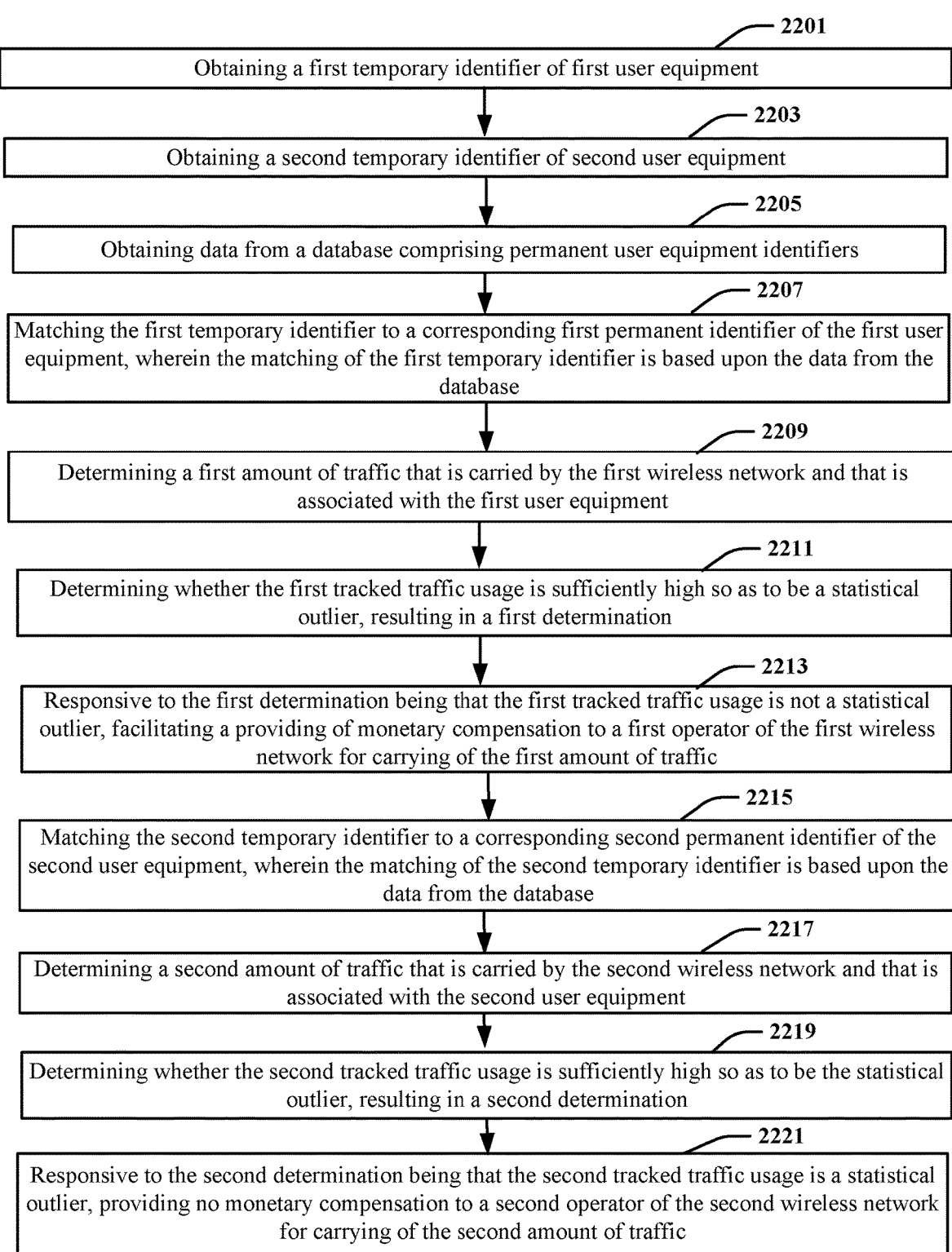

2201
Obtaining a first temporary identifier of first user equipment

2203
Obtaining a second temporary identifier of second user equipment

2205
Obtaining data from a database comprising permanent user equipment identifiers 2207
Matching the first temporary identifier to a corresponding first permanent identifier of the first user equipment, wherein the matching of the first temporary identifier is based upon the data from the database 2209
Determining a first amount of traffic that is carried by the first wireless network and that is associated with the first user equipment 2211
Determining whether the first tracked traffic usage is sufficiently high so as to be a statistical outlier, resulting in a first determination 2213
Responsive to the first determination being that the first tracked traffic usage is not a statistical outlier, facilitating a providing of monetary compensation to a first operator of the first wireless network for carrying of the first amount of traffic 2215
Matching the second temporary identifier to a corresponding second permanent identifier of the second user equipment, wherein the matching of the second temporary identifier is based upon the data from the database 2217
Determining a second amount of traffic that is carried by the second wireless network and that is associated with the second user equipment 2219
Determining whether the second tracked traffic usage is sufficiently high so as to be the statistical outlier, resulting in a second determination 2221
Responsive to the second determination being that the second tracked traffic usage is a statistical outlier, providing no monetary compensation to a second operator of the second wireless network for carrying of the second amount of traffic

FIG. 2E        2200

Figure 2F:
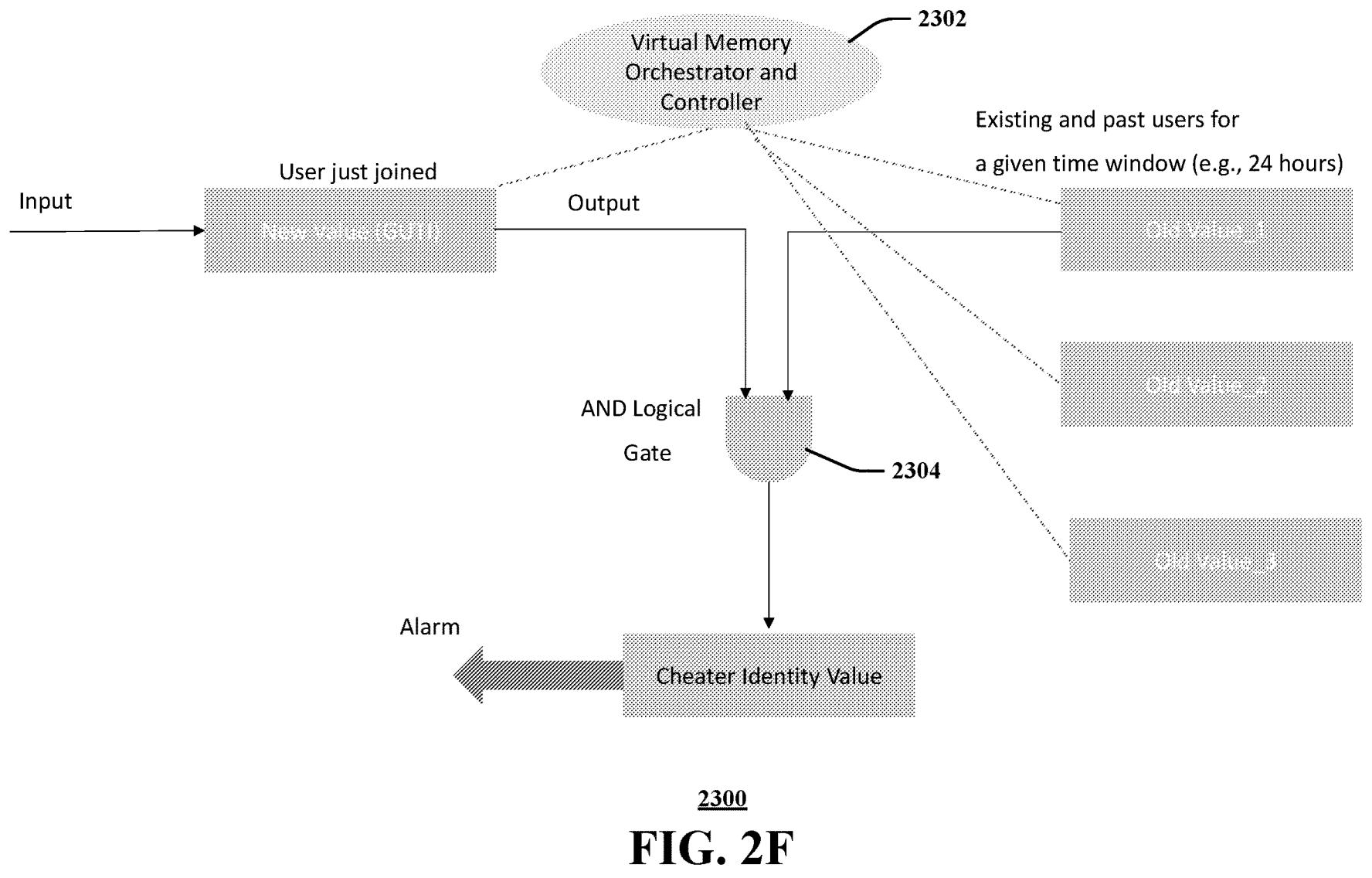

Existing and past users for a given time window (e.g., 24 hours)

2302

Virtual Memory Orchestrator and Controller

2304

Output

AND Logical Gate

Cheater Identity Value

Alarm

User just joined

Input

DECENTRALIZED NETWORK REWARD DATA USAGE TRACKING

CROSS REFERENCE TO RELATED APPLICATION(S)

This application claims priority to U.S. Provisional Patent Application No. 63/351,154 filed on Jun. 10, 2022. All sections of the aforementioned application(s) and/or patent(s) are incorporated herein by reference in their entirety.

FIELD OF THE DISCLOSURE

The subject disclosure relates to decentralized network reward data usage tracking.

BACKGROUND

Decentralized networks can be created when individual network hotspot owner(s), or private RAN node owner(s), determine the capacity and location of network hotspot (or private RAN node) deployment (rather than such determination(s) being made by a centralized network planning organization). Hotspot (or private RAN node) owners can receive a "reward" for purchasing, deploying, and maintaining network coverage. Often, the reward is usage-based.

There can be a financial incentive for some reward recipients to "game" the system, especially when the reward is usage-based, while some network users have an "unlimited" usage rate plan.

BRIEF DESCRIPTION OF THE DRAWINGS

Reference will now be made to the accompanying drawings, which are not necessarily drawn to scale, and wherein:

FIG. 2C depicts an illustrative embodiment of a method in accordance with various aspects described herein.

FIG. 2D depicts an illustrative embodiment of a method in accordance with various aspects described herein.

FIG. 2E depicts an illustrative embodiment of a method in accordance with various aspects described herein.

FIG. 2F is a block diagram illustrating an example, non-limiting embodiment of a system (which can function fully or partially within the communication network of FIG. 1) in accordance with various aspects described herein.

DETAILED DESCRIPTION

Figure 1:
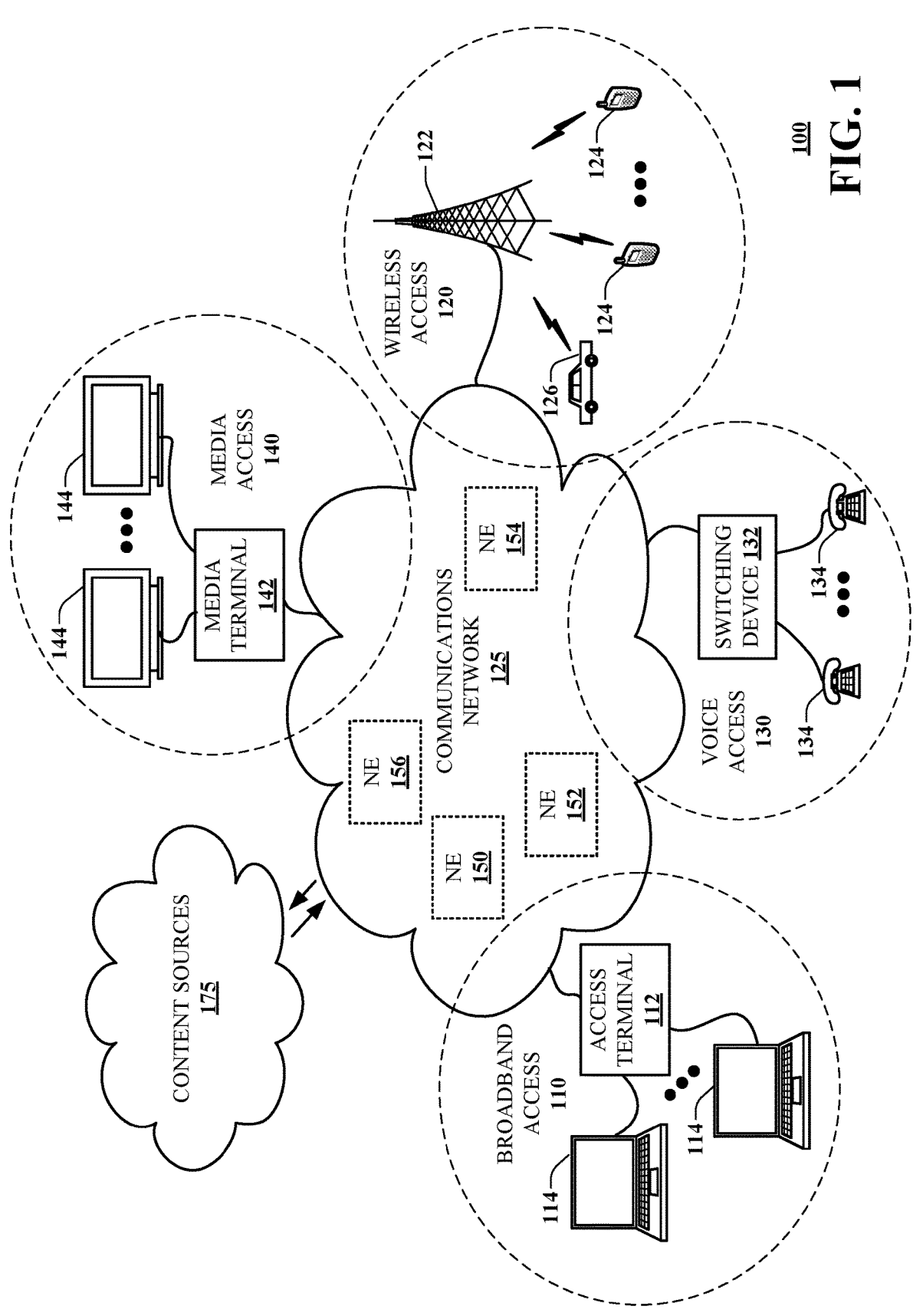
FIG. 1 is a block diagram illustrating an example, non-limiting embodiment of a communication network in accordance with various aspects described herein.

The subject disclosure describes, among other things, illustrative embodiments for decentralized network reward data usage tracking. Other embodiments are described in the subject disclosure.

As described herein, various embodiments can provide for making certain network measurements in order to permit "unlimited" usage (where approved by a rate plan) while eliminating (or reducing) the financial incentive to "game" the system. In one example, by capping the financial reward per device, the financial incentive is removed for a hotspot owner to obtain a device with an "unlimited" data plan and simply "pump" large amounts of data through the device for no useful purpose, other than generating hotspot rewards.

As described herein, various embodiments can provide mechanisms to allow "unlimited" usage and at the same time "limited" rewards. In various examples, in order to accomplish this task, usage measurements can be made: (a) per carrier; (b) per hotspot; and (c) per user equipment (UE). In one specific example, the per UE measurements need not identify the actual owner of the UE, but simply be able to distinguish one UE from another.

As described herein, various embodiments can provide for combining a conventional temporary identifier with a conventional device identifier in a new way. In this regard, it is noted that certain conventional temporary identifiers associated with data traffic between the UE and the hotspot (such as a Temporary Mobile Subscriber Identity (TMSI)) will change each time a UE moves in and out of a RAN coverage area. On the other hand, a device identifier such as a conventional International Mobile Equipment Identity (IMEI)) is a globally unique mechanism to distinguish one device from another. By building (according to various embodiments) a relationship between a TMSI and an IMEI, it is possible to aggregate usage across multiple sessions with a given hotspot (e.g., in order to determine the total data usage carried by that hotspot for that particular UE during a given time period). In other examples, other temporary identifiers (other than TMSI) and/or other device identifiers (other than IMEI) could be used. In another example, instead of using a TMSI as a temporary identifier, a Globally Unique Temporary UE Identity (GUTI) can be used (GUTI is the LTE equivalent of TMSI in 2G/3G). In another example, any desired temporary identifier can be used.

One or more aspects of the subject disclosure include a device comprising: a processing system including a processor; and a memory that stores executable instructions that, when executed by the processing system, facilitate performance of operations, the operations comprising: receiving, based upon a first communication between first user equipment and a first wireless network, a first temporary identifier of the first user equipment; correlating the first temporary identifier to a first permanent identifier of the first user equipment; tracking a first amount of data that is carried by the first wireless network and that is associated with the first user equipment, resulting in first tracked data usage, wherein the tracking is based upon the correlating of the first temporary identifier to the first permanent identifier; determining whether the first tracked data usage exceeds a first threshold, resulting in a first determination; and responsive to the first determination being that the first tracked data usage does not exceed the first threshold, providing a first reward to a first operator of the first wireless network.

One or more aspects of the subject disclosure include a non-transitory machine-readable medium comprising executable instructions that, when executed by a processing system including a processor, facilitate performance of operations, the operations comprising: obtaining a first temporary identifier of first user equipment that has communicated with a wireless network; obtaining a second temporary identifier of second user equipment that has communicated with the wireless network; obtaining data from a database of permanent user equipment identifiers; matching the first temporary identifier, based upon the data from the database, to a corresponding first permanent identifier of the first user equipment; determining a first amount of traffic that is carried by the wireless network and that is associated with the first user equipment, resulting in first determined traffic usage, wherein the determining of the first amount is based upon the matching of the first temporary identifier; determining whether the first determined traffic usage is sufficiently high so as to be a statistical outlier, resulting in a first determination; responsive to the first determination being that the first determined traffic usage is not sufficiently high so as to be a statistical outlier, facilitating a providing of monetary compensation to an operator of the wireless network for carrying of the first amount of traffic; matching the second temporary identifier, based upon the data from the database, to a corresponding second permanent identifier of the second user equipment; determining a second amount of traffic that is carried by the wireless network and that is associated with the second user equipment, resulting in second determined traffic usage, wherein the determining of the second amount is based upon the matching of the second temporary identifier; determining whether the second determined traffic usage is sufficiently high so as to be the statistical outlier, resulting in a second determination; and responsive to the second determination being that the second determined traffic is sufficiently high so as to be the statistical outlier, providing no monetary compensation to the operator of the wireless network for carrying of the second amount of traffic.

One or more aspects of the subject disclosure include a method, comprising: obtaining, by a processing system including a processor, a first temporary identifier of first user equipment that has communicated with a first wireless network; obtaining, by the processing system, a second temporary identifier of second user equipment that has communicated with a second wireless network, the second wireless network being distinct from the first wireless network; obtaining, by the processing system, data from a database comprising permanent user equipment identifiers; matching, by the processing system, the first temporary identifier to a corresponding first permanent identifier of the first user equipment, wherein the matching of the first temporary identifier is based upon the data from the database; determining, by the processing system, a first amount of traffic that is carried by the first wireless network and that is associated with the first user equipment, resulting in first tracked traffic usage, wherein the determining of the first amount is based upon the matching of the first temporary identifier; determining, by the processing system, whether the first tracked traffic usage is sufficiently high so as to be a statistical outlier, resulting in a first determination; responsive to the first determination being that the first tracked traffic usage is not a statistical outlier, facilitating a providing of monetary compensation to a first operator of the first wireless network for carrying of the first amount of traffic;

matching, by the processing system, the second temporary identifier to a corresponding second permanent identifier of the second user equipment, wherein the matching of the second temporary identifier is based upon the data from the database; determining, by the processing system, a second amount of traffic that is carried by the second wireless network and that is associated with the second user equipment, resulting in second tracked traffic usage, wherein the determining of the second amount is based upon the matching of the second temporary identifier; determining, by the processing system, whether the second tracked traffic usage is sufficiently high so as to be the statistical outlier, resulting in a second determination; and responsive to the second determination being that the second tracked traffic usage is a statistical outlier, providing no monetary compensation to a second operator of the second wireless network for carrying of the second amount of traffic.

Referring now to FIG. 1, a block diagram is shown illustrating an example, non-limiting embodiment of a system 100 in accordance with various aspects described herein. For example, system 100 can facilitate in whole or in part tracking of UE data usage, such as in a decentralized system (in various embodiments, the tracked data usage can facilitate provision (or denial) of a reward or other incentive to an entity that operates a wireless access point (such as a hotspot)). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
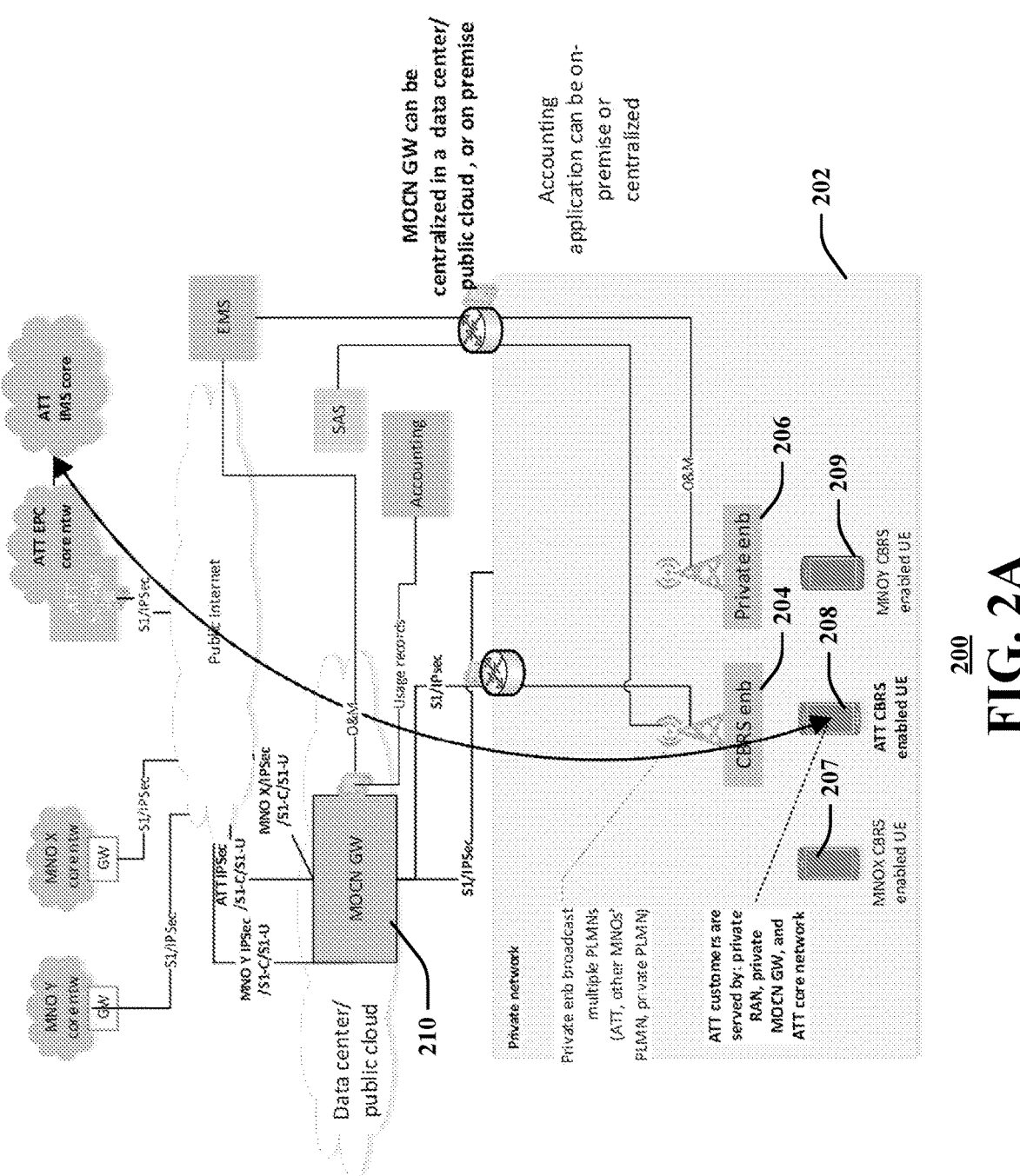
FIG. 2A is a block diagram illustrating an example, non-limiting embodiment of a system (which can function fully or partially within the communication network of FIG. 1) in accordance with various aspects described herein.

Referring now to FIG. 2A, this is a block diagram illustrating an example, non-limiting embodiment of a system 200 (which can function fully or partially within the communication network of FIG. 1) in accordance with various aspects described herein. In this figure, the acronym MNO means mobile network operator, the acronym MOCN means multi-operator core network, the acronym MOCN GW means MOCN gateway, and the acronym CBRS means citizen band radio spectrum. The system 200 can include a private network 202 (including, in this example, CBRS eNodeB 204 and private eNodeB 206), Further, a number of UEs 207, 208, 209 can be supported (in this example, there are three UEs—an AT&T CBRS-enabled UE, an MNOX CBRS-enabled UE (the MNOX being a mobile network operator other than AT&T), and an MNOY CBRS-enabled UE (the MNOY being yet another mobile network operator other than AT&T)). In various embodiments, the system 200 can be used for data usage tracking as described below. More particularly, the system 200 can facilitate a method for tracking usage per user without tracking users. In one example, a strategy can be as follows:

Make MOCN GW 210 push Identity Request when new GUTI (use as "trigger"), so that IMEI and IMSI is sent.

In one specific example, data usage is tied to user by IMSI and IMEI. Calculate the total data per "day" to see if it runs over cap.

Preserves privacy . . . in one example, will not hold this data more than X hours, unless the user is "gaming" the system.

The IMSI could be hashed or encrypted.

The results can be tied the crypto rewards.

Still referring to FIG. 2A, in various examples: (a) for each UE, we don't need to know actual identity, just to be able to distinguish one UE from another; (b) we use IMEI with TMSI (or other temporary identifier), to confirm whether it is the same UE or a new UE, when the TMSI (or other temporary identifier) attaches to the RAN; (c) use the IMEI to link together TMSI (or other temporary identifier) each time a UE presents a new TMSI (or other temporary identifier); (d) use the IMEI to link together TMSI (or other temporary identifier) each time a UE enters the radio coverage area; and/or (e) IMEI refers to the "device" but not the "subscriber".

Figure 2B:
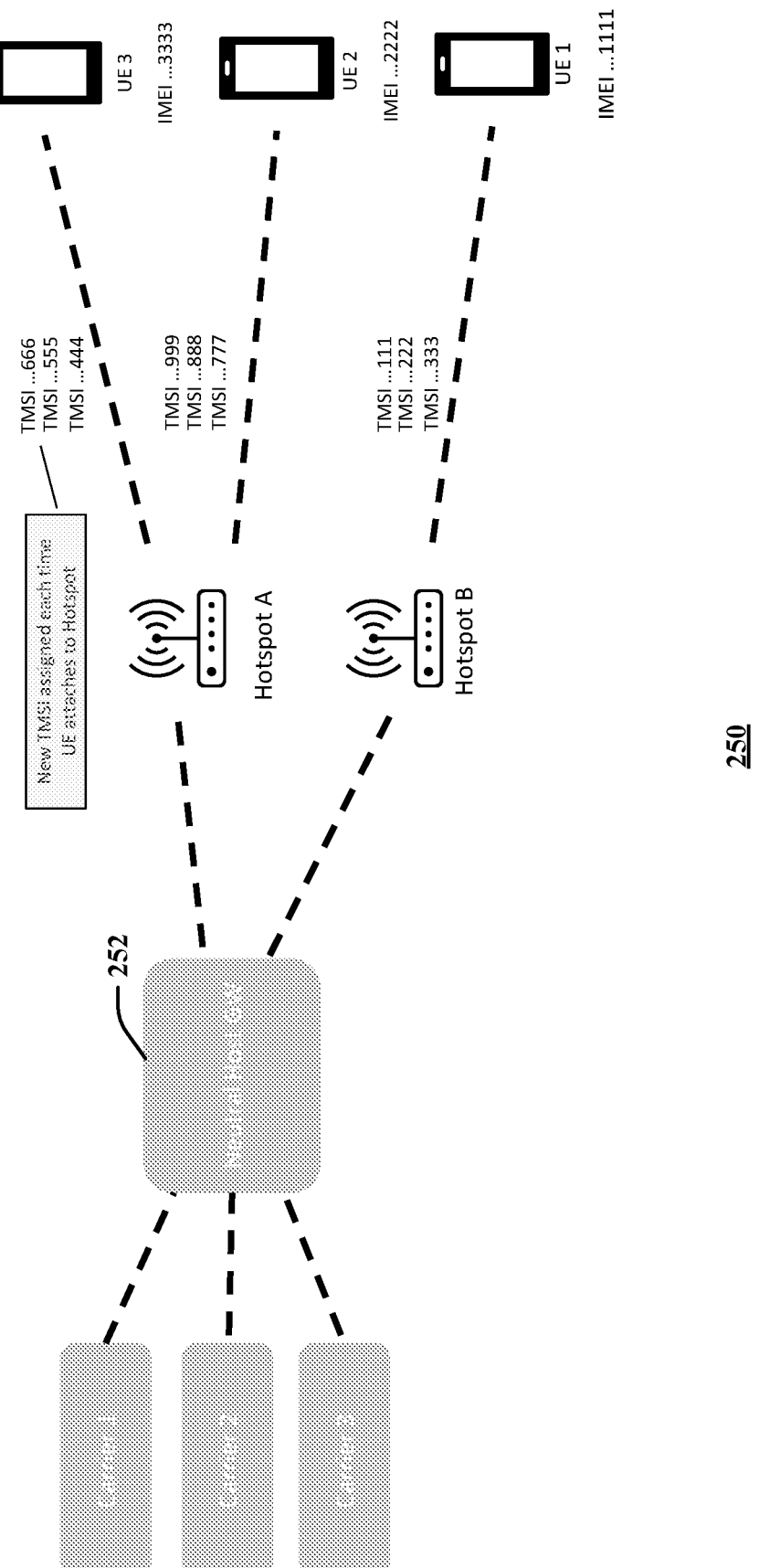
FIG. 2B is a block diagram illustrating an example, non-limiting embodiment of a system (which can function fully or partially within the communication network of FIG. 1) in accordance with various aspects described herein.

Referring now to FIG. 2B, this is a block diagram illustrating an example, non-limiting embodiment of a system 250 (which can function fully or partially within the communication network of FIG. 1) in accordance with various aspects described herein. In various examples, this system 250 can facilitate a method for tracking usage per user without tracking users. In the example shown in this figure, there are three UEs (UE 1, UE 2, UE3). Each time a UE attaches to a Hotspot (see Hotspot A and Hotspot B) a new TMSI is assigned (a Temporary Mobile Subscriber Identity (TMSI) is a conventional temporary identification number that is used in the GSM network instead of the IMSI to ensure the privacy of the mobile subscriber). As seen in this example, UE 1 has an IMEI of 1111, UE 1 has attached to Hotspot B three times, and UE 1 has been assigned TMSI 111, TMSI 222, TMSI 333. Further, as seen in this example, UE 2 has an IMEI of 2222, UE 2 has attached to Hotspot A three times, and UE 2 has been assigned TMSI 777, TMSI 888, TMSI 999. Further, as seen in this example, UE 3 has an IMEI of 3333, UE 3 has attached to Hotspot A three times, and UE 3 has been assigned TMSI 444, TMSI 555, TMSI 666.

Still referring to FIG. 2B, each of Hotspot A and Hotspot B is configured for bidirectional communication with Neutral Host GW (Gateway) 252. In addition, Neutral Host GW 252 is configured for bidirectional communication with each of Carrier 1 (e.g., one or more servers of Carrier 1), Carrier 2 (e.g., one or more servers of Carrier 2), and Carrier 3 (e.g., one or more servers of Carrier 3).

Still referring to FIG. 2B, various Data Usage Measurements can be as follows:

Per-Carrier—used for carrier settlement—sum of all UE Data for Carrier X

Per Hotspot—used for Hotspot crypto rewards—Sum of all per UE "Reward Data"

Per UE Reward Data—used for "anti-gaming" reward caps. For example:

Max reward per UE/per Hotspot/per day

Max reward per UE group/per Hotspot/per day

Other similar anomalous data usage per Hotspot

Per UE Usage Data—For example:

TMSI . . . 999. IMEI2222+TMSI . . . 888.IMEI2222+ TMSI . . . 777.IMEI222 (all associated with IMEI 2222)

ID Request to obtain IMEI

Calculate Per UE Reward Data usage per IMEI

Still referring to FIG. 2B, in one example, Neutral Host GW 252 can be operated by an entity independent of each operator of Carrier 1, Carrier 2, and Carrier 3. In another example, each TMSI can be requested by Neutral Host GW 252. In another example, each IMEI can be requested by Neutral Host GW 252. In another example, Neutral Host GW 252 can provide data (e.g., accounting data) to each of Carrier 1, Carrier 2, and Carrier 3. In one example, the accounting data provided to each carrier can be specific to that carrier's subscribers (and can exclude data related to other carrier's subscribers).

Referring now to FIG. 2C, various steps of a method 2000 according to an embodiment are shown. As seen in this FIG. 2C, step 2001 comprises receiving, based upon a first communication between first user equipment and a first wireless network, a first temporary identifier of the first user equipment. Next, step 2003 comprises correlating the first temporary identifier to a first permanent identifier of the first user equipment. Next, step 2005 comprises tracking a first amount of data that is carried by the first wireless network and that is associated with the first user equipment, resulting in first tracked data usage, wherein the tracking is based upon the correlating of the first temporary identifier to the first permanent identifier. Next, step 2007 comprises determining whether the first tracked data usage exceeds a first threshold, resulting in a first determination. Next, step 2009 comprises responsive to the first determination being that the first tracked data usage does not exceed the first threshold, providing a first reward to a first operator of the first wireless network.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2D, various steps of a method 2100 according to an embodiment are shown. As seen in this FIG. 2D, step 2101 comprises obtaining a first temporary identifier of first user equipment that has communicated with a wireless network. Next, step 2103 comprises obtaining a second temporary identifier of second user equipment that has communicated with the wireless network. Next, step 2105 comprises obtaining data from a database of permanent user equipment identifiers. Next, step 2107 comprises matching the first temporary identifier, based upon the data from the database, to a corresponding first permanent identifier of the first user equipment. Next, step 2109 comprises determining a first amount of traffic that is carried by the wireless network and that is associated with the first user equipment, resulting in first determined traffic usage, wherein the determining of the first amount is based upon the matching of the first temporary identifier. Next, step 2111 comprises determining whether the first determined traffic usage is sufficiently high so as to be a statistical outlier, resulting in a first determination. Next, step 2113 comprises responsive to the first determination being that the first determined traffic usage is not sufficiently high so as to be a statistical outlier, facilitating a providing of monetary compensation to an operator of the wireless network for carrying of the first amount of traffic. Next, step 2115 comprises matching the second temporary identifier, based upon the data from the database, to a corresponding second permanent identifier of the second user equipment. Next, step 2117 comprises determining a second amount of traffic that is carried by the wireless network and that is associated with the second user equipment, resulting in second determined traffic usage, wherein the determining of the second amount is based upon the matching of the second temporary identifier. Next, step 2119 comprises determining whether the second determined traffic usage is sufficiently high so as to be the statistical outlier, resulting in a second determination. Next, step 2121 comprises responsive to the second determination being that the second determined traffic is sufficiently high so as to be the statistical outlier, providing no monetary compensation to the operator of the wireless network for carrying of the second amount of traffic.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2E, various steps of a method 2200 according to an embodiment are shown. As seen in this FIG. 2E, step 2201 comprises obtaining, by a processing system including a processor, a first temporary identifier of first user equipment that has communicated with a first wireless network. Next, step 2203 comprises obtaining, by the processing system, a second temporary identifier of second user equipment that has communicated with a second wireless network, the second wireless network being distinct from the first wireless network. Next, step 2205 comprises obtaining, by the processing system, data from a database comprising permanent user equipment identifiers. Next, step 2207 comprises matching, by the processing system, the first temporary identifier to a corresponding first permanent identifier of the first user equipment, wherein the matching of the first temporary identifier is based upon the data from the database. Next, step 2209 comprises determining, by the processing system, a first amount of traffic that is carried by the first wireless network and that is associated with the first user equipment, resulting in first tracked traffic usage, wherein the determining of the first amount is based upon the matching of the first temporary identifier. Next, step 2211 comprises determining, by the processing system, whether the first tracked traffic usage is sufficiently high so as to be a statistical outlier, resulting in a first determination. Next, step 2213 comprises responsive to the first determination being that the first tracked traffic usage is not a statistical outlier, facilitating a providing of monetary compensation to a first operator of the first wireless network for carrying of the first amount of traffic. Next, step 2215 comprises matching, by the processing system, the second temporary identifier to a corresponding second permanent identifier of the second user equipment, wherein the matching of the second temporary identifier is based upon the data from the database. Next, step 2217 comprises determining, by the processing system, a second amount of traffic that is carried by the second wireless network and that is associated with the second user equipment, resulting in second tracked traffic usage, wherein the determining of the second amount is based upon the matching of the second temporary identifier. Next, step 2219 comprises determining, by the processing system, whether the second tracked traffic usage is sufficiently high so as to be the statistical outlier, resulting in a second determination. Next, step 2221 comprises responsive to the second determination being that the second tracked traffic usage is a statistical outlier, providing no monetary compensation to a second operator of the second wireless network for carrying of the second amount of traffic.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2F, this is a block diagram illustrating an example, non-limiting embodiment of a Privacy Preservation system 2300 (which can function fully or partially within the communication network of FIG. 1) in accordance with various aspects described herein. More particularly, each value box (New Value (GUTI), Old Value_1, Old Value_2, Old Value_3) is a separate physical (virtual) memory with a preconfigured timer that can only be set once at the beginning of an epoch. Memory is segmented and physically isolated and not shared by other processes with no user interface and only one Input interface and one Output interface that are hardcoded by the virtual memory orchestrator and controller 2302 (e.g., one coming from the MOCN GUTI read process and the output goes to the AND gate 2304). One bi-directional control channel is to the virtual memory orchestrator and controller 2302. The mini orchestrator can be added to the design and every time a new user joins the wireless network, a new memory segmentation can be spun up and old one is discarded after timer expiration. The virtual memory orchestrator and controller 2302 connects the AND gate 2304 to each existing memory segmentation. Only matches will come out of this system, the rest of the records will be discarded. An example Memory Segmentation <—> AND Gate handshake is as follows: The AND gate 2304 has to provide a key to the Memory Segmentation to have its output gate to open and communicate. A specific example is as follows: The AND gate 2304 has to provide the Memory Segmentation Key=1234, to open the output interface on the memory which was created as a locked interface when it was spun up by the virtual memory orchestrator and controller 2302.

As described herein, various embodiments can provide for keeping certain information (e.g., each user's information) private. In one example, there can be a separate physical virtual memory with a preconfigured timer that can only be set once it begins with a poke. In another example, there can be memory segmentation. In one specific example, if there are 10 users, a virtual memory orchestrator and controller will create separate isolated little pieces of memory for each (wherein each memory can hold one value, such as any kind of identification). In one example, a virtual memory can be created with only three interfaces. In one example, a virtual memory can be hardcoded (e.g., so that no unauthorized person can access it). In one example, an AND logic gate can have a hardcoded address (and an associated mechanism to unlock it). In one example, a new input can be received and the new input can be compared to different values (e.g., value_1, value_2, value_3), wherein if the new input has the same value, then there will be an output but if the new input does not match then there will be no output. In one example, a mechanism can provide for keeping privacy (e.g., by only flagging out the offenders). In one example, when the memory is set up it has a timer that gets set up once (e.g., 24 hours timer or 2 hours timer—depending on the poke that the administrators want). In one example, the memories can be physically isolated, not shared by other processes. In one example, a number of individual segmentations (memory segmentations) can be made based upon (e.g., to equal) the exact number of users and then every time a new user arrives, a new segmentation (memory segmentation) can be created for him or her. In one example, an AND gate can be created for each existing customer, so only the matches will come out. In one example, there can be handshaking between the memory segmentation and the AND gate (e.g., so that no unauthorized person can just focus on the AND gate and try to extract the information from the segmentation). In one example, the virtual memory orchestrator and controller can control when the interface gets unlocked. In one example, the interface is a communication interface that gets unlocked by the logical AND gate (e.g., via use of a keyword). In one example, the AND logical gate has a secret encrypted key (it could be a same key, or it could be a dynamic key once it is presented to the segmentation).

As described herein, various embodiments can provide for data usage tracking to facilitate giving of compensation to a hotspot owner/operator (e.g., wherein the number of gigabytes of traffic that goes through a hotspot is related to the compensation that would be received).

As described herein, various embodiments can operate in the context of 5G cellular hotspots (and/or in the context of any other desired radio spectrum). In one example, the hotspots can be operated in unlicensed spectrum (e.g., CBRS (citizen band radio spectrum)).

As described herein, various embodiments can operate by having customer data pass through a hotspot, rather than through a traditional carrier macrocell.

As described herein, various embodiments can operate to aggregate data (e.g., from different times) to determine a total amount of data that was consumed (wherein, for example, individual handsets are distinguishable from one another). In one example, multiple TMSI's from multiple communication sessions are used to aggregate data. In one example, a TMSI is requested and/or generated by a hotspot. In one example, a TMSI is requested and/or generated by user equipment (e.g., a handset or smartphone). In one example, a TMSI is assigned by a core network of a carrier.

As described herein, various embodiments can operate using an ID request protocol to obtain an IMEI and/or a TMSI. In one example, a TMSI can be used in a request (e.g., send a TMSI and request the corresponding IMEI). In one example, an IMEI can be used in a request (e.g., send a IMEI and request the corresponding TMSI). In one example, each TMSI and its corresponding IMEI can be in a concatenated form. In one example, based on a given TMSI and/or a given IMEI, an accounting function can calculate the amount of data carried by a hotspot for given user equipment. In one example, a reward can be capped (e.g., the maximum amount of data (for given user equipment) that will be compensated can be capped). In one example, data above a certain threshold will not be compensated (e.g., no compensation for data above the 99th percentile of the typical usage of a subscriber, or no compensation for data above the 95th percentile of the typical usage of a subscriber).

As described herein, a Neutral Host Gateway can initiate a ping or request (e.g., identity request message) to user equipment for various information (e.g., the Neutral Host Gateway can ask user equipment (e.g., a handset, a smartphone) for its IMEI and/or TMSI).

As described herein, various embodiments can facilitate anti-gaming calculations and/or determinations to be done at the carrier level (e.g., wherein each individual carrier may have different rules).

As described herein, various embodiments can facilitate a sharing mechanism between the carriers and/or in the background (e.g., a cross-carrier sharing mechanism that facilitates cooperation between carriers).

As described herein, in various embodiments a neutral host gateway can be operated by an independent entity (e.g., independent of the carriers). In one example, a given neutral host gateway can support multiple carriers and a given hotspot can support multiple carriers. In one example, a neutral host gateway can essentially act as a router, and route traffic to/from each corresponding carrier's back-end core network.

As described herein, various embodiments can provide for a shared accounting mechanism and/or a centralized accounting function. In one example, a security and privacy mechanism can ensure that each carrier has access to only that carrier's data (and not to data of another carrier).

As described herein, a neutral host gateway can make requests to get the temporary and permanent identification information and then generate usage data statistics based upon the identification information. Further, the appropriate carrier can then use the usage data statistics to do the anti-gaming calculations. In one example, each carrier can have accounting functionality residing on the carrier side that could pull usage records (e.g., from a neutral host gateway) and then do the calculations and rewards.

As described herein, various embodiments can provide a mechanism to measure the overall data usage for a single UE.

As described herein, hotspots can be owned and/or operated by various entities. In various examples, these entities can be classified into three general categories: (a) Carriers; (b) Enterprises (e.g., university, mall, store); and/or (c) private individual.

As described herein, various embodiments can provide for decentralized network reward data usage tracking.

As described herein, various embodiments can provide for mechanisms that can make the needed network measurements in order to permit "unlimited" usage (where approved by a rate plan) while eliminating (or reducing) the financial incentive to "game" the system.

As described herein, various embodiments can operate in the context of a decentralized network developer that provides rewards (e.g., financial rewards, monetary rewards, credits, rebates, or any combination thereof) based on usage.

As described herein, any desired temporary identifier (e.g., that comprises TMSI, GUTI, and/or a new (different) identifier that comes up in future wireless generations such as 5G/6G) can be used.

In various examples, a new GUTI can be assigned either at: 1) The network attach procedure; or 2) Through periodic GUTI reassignments.

In one example (related to LTE), periodic GUTI reallocation allocates a new GUTI to a UE after a specified period has elapsed since the last GUTI allocation. Such periodic GUTI reallocation can be triggered by Intra-MME TAU, or Service Request if enabled. The Intra-MME TAU can include periodic TAU and TAU after S1-based or X2-based handover.

In one example (related to GSM and WCDMA), via periodic P-TMSI reallocation, the SGSN-MME can allocate a new P-TMSI to a UE after a specified period has elapsed since the last P-TMSI allocation. Such periodic P-TMSI reallocation can be triggered by periodic RAU, uplink LLC frames, or Service Request.

In one example, an MME can engage in the process of assigning a new TMSI (and/or a new GUTI) to the UE as a result of the attach procedure.

In various examples, a GUTI can be assigned by the MME/AMF and doesn't have to change every time UE attaches to a new RAN. In various specific examples, the MME (LTE) and AMF(5G) can assign GUTI when UE attaches to the MME/AMF, or when UE reports Tracking Area Updates, and the MME/AMF might also do periodical re-assignments. In various examples, when UE does handover from macro ATT RAN into one of these hotspots, or private RAN nodes, if the same MME/AMF serves both macro RAN and hotspot/private RAN, the GUTI doesn't have to change. In one example, the GUTI can change if the private RAN/Hotspot is in a different Tracking area than the macro RAN. In one example, these Neutral Host private RAN deployments can have distinct Tracking area than the macro ATT RAN.

In various examples, the temporary identity can be GUTI (in LTE), 5G-GUTI (in 5G), TMSI (in 3G), or any combination thereof.

Figure 3:
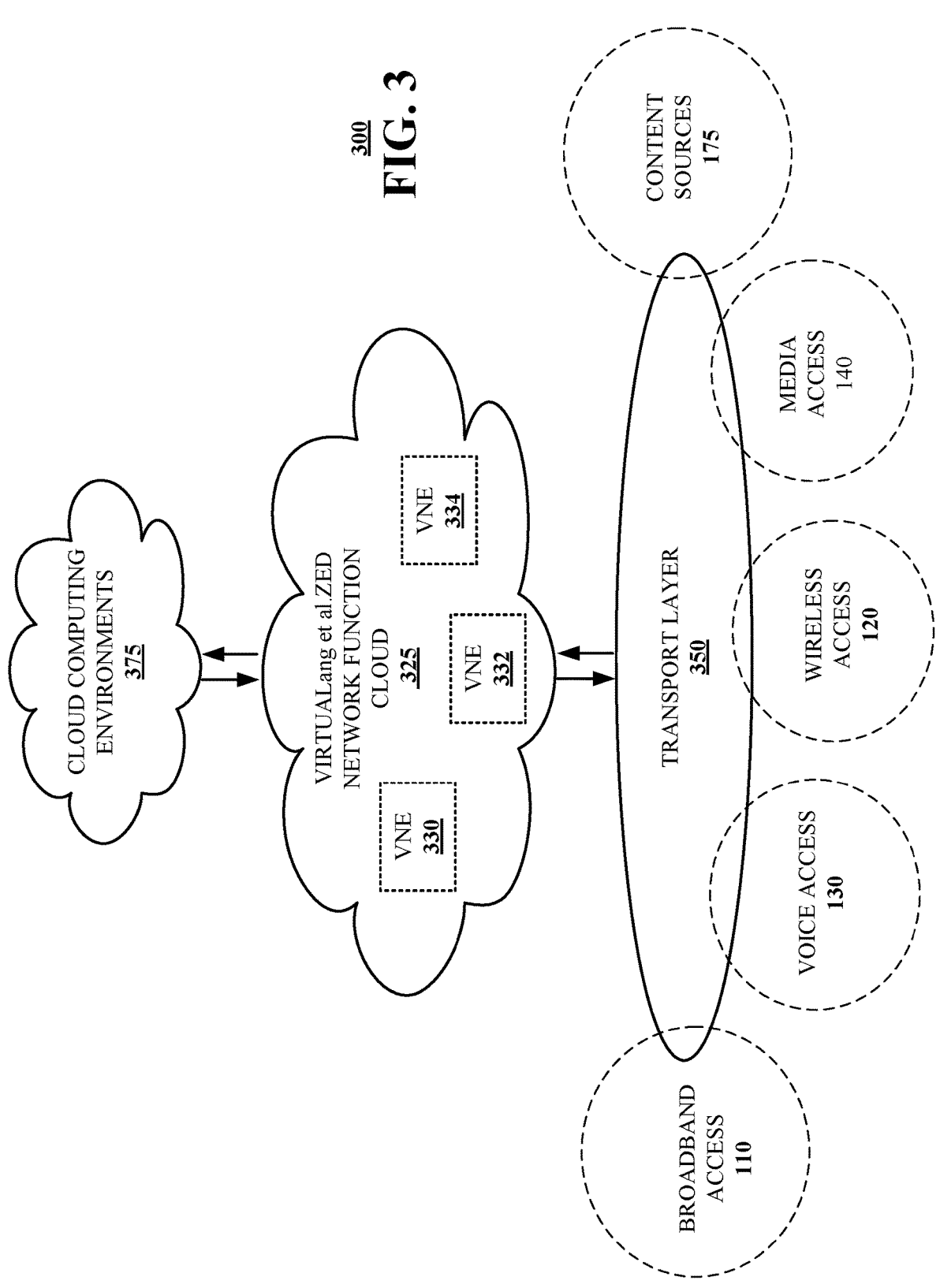
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of systems 100, 200, 250, and 2300, and/or some or all of the functions of methods 2000, 2100, and 2200. For example, virtualized communication network 300 can facilitate in whole or in part tracking of UE data usage, such as in a decentralized system (in various embodiments, the tracked data usage can facilitate provision (or denial) of a reward or other incentive to an entity that operates a wireless access point (such as a hotspot)).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
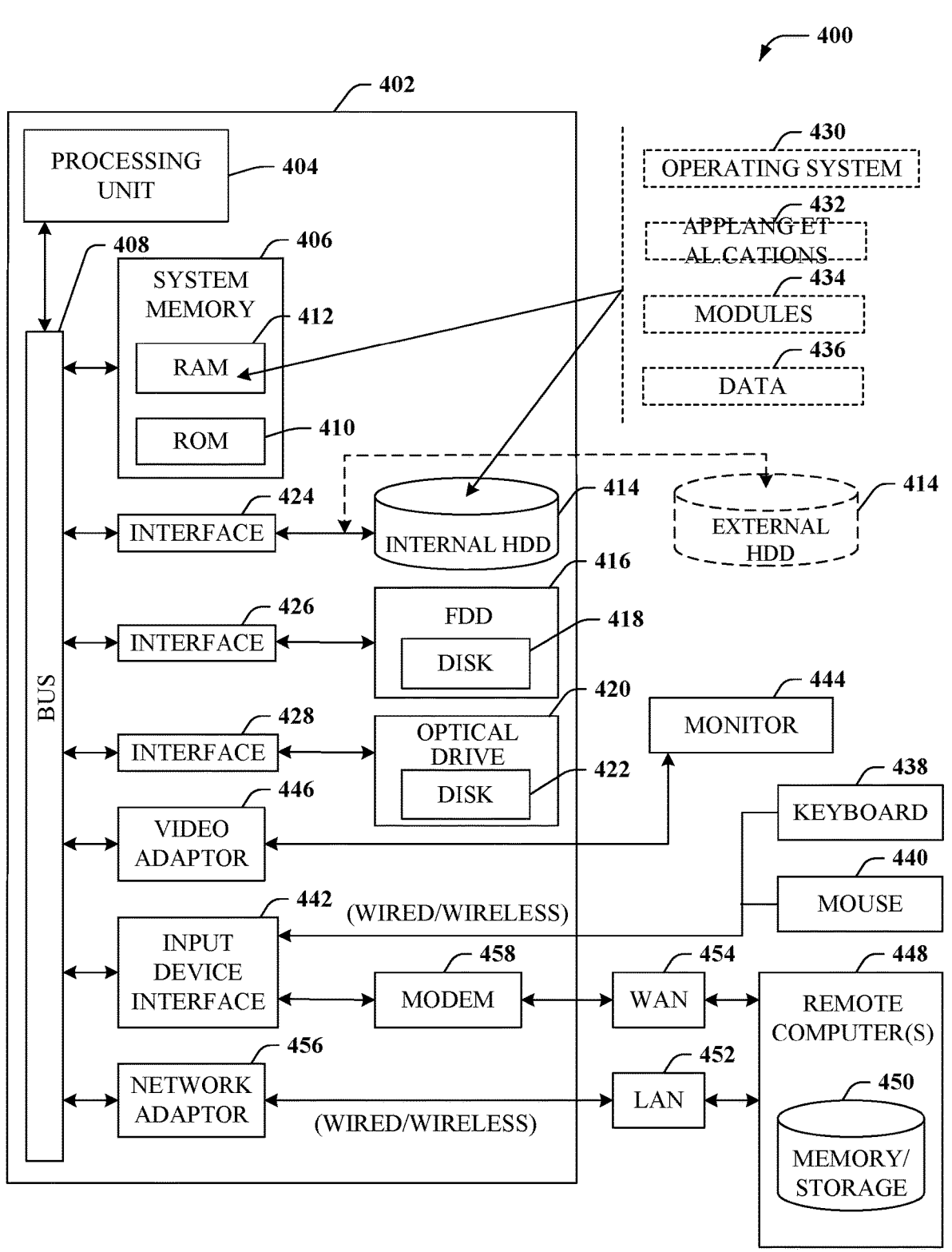
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part tracking of UE data usage, such as in a decentralized system (in various embodiments, the tracked data usage can facilitate provision (or denial) of a reward or other incentive to an entity that operates a wireless access point (such as a hotspot)).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device

450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
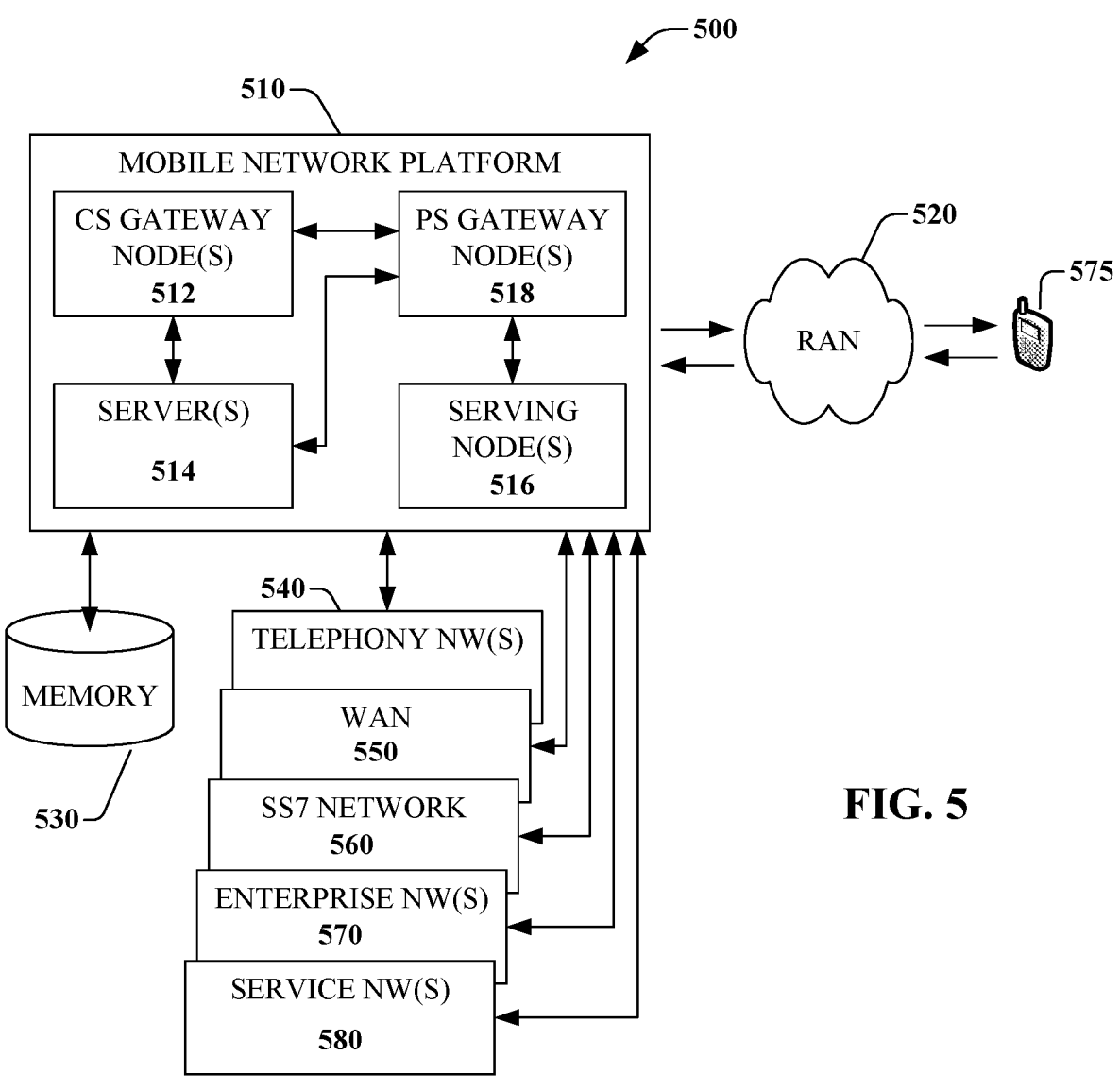
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part tracking of UE data usage, such as in a decentralized system (in various embodiments, the tracked data usage can facilitate provision (or denial) of a reward or other incentive to an entity that operates a wireless access point (such as a hotspot)). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
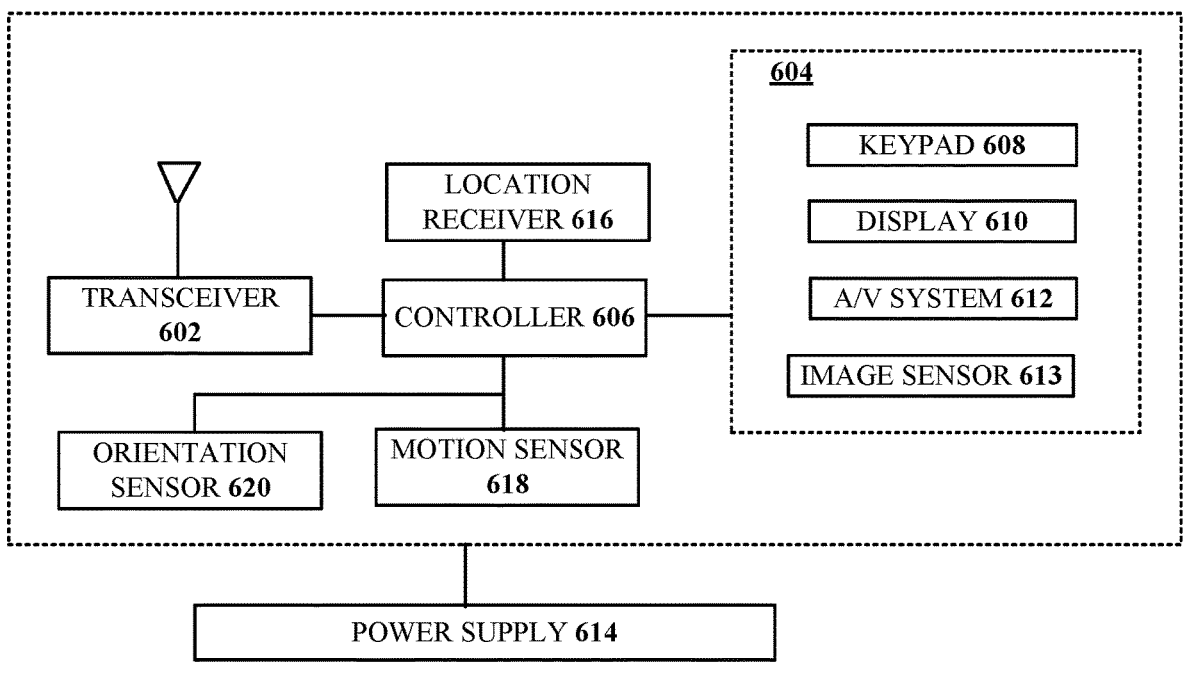
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part tracking of UE data usage, such as in a decentralized system (in various embodiments, the tracked data usage can facilitate provision (or denial) of a reward or other incentive to an entity that operates a wireless access point (such as a hotspot)).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically tracking of data usage by user equipment (such as in a decentralized system)) can employ various AI-based schemes for carrying out various embodiments thereof. Moreover, the classifier can be employed to determine a ranking or priority of each user equipment and/or of each hotspot. A classifier is a function that maps an input attribute vector, $x=(x_1, x_2, x_3, x_4 \ldots x_n)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to automatically tracking of data usage by user equipment (such as in a decentralized system), etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:
1. A device comprising:
a processing system including a processor; and
a memory that stores executable instructions that, when executed by the processing system, facilitate performance of operations, the operations comprising:
    receiving, based upon a first communication between first user equipment and a first wireless network, a first temporary identifier of the first user equipment;
    correlating the first temporary identifier to a first permanent identifier of the first user equipment, wherein the correlating further comprises:

initiating, in response to receipt of the first temporary identifier, an identity (ID) request protocol to obtain a first permanent identifier of the first user equipment, and
        associating the first temporary identifier with the first permanent identifier by storing a mapping between the first temporary identifier and the first permanent identifier, wherein the mapping enables aggregation of data usage for the first user equipment across multiple temporary identifiers assigned during different communication sessions;
    tracking a first amount of data that is carried by the first wireless network and that is associated with the first user equipment, resulting in first tracked data usage, wherein the tracking is based upon the correlating of the first temporary identifier to the first permanent identifier;
    determining whether the first tracked data usage exceeds a first threshold, resulting in a first determination; and
    responsive to the first determination being that the first tracked data usage does not exceed the first threshold, providing a first reward to a first operator of the first wireless network.

2. The device of claim 1, wherein:
the first temporary identifier comprises a TMSI, a GUTI, or any combination thereof; and
the first permanent identifier comprises an IMEI.

3. The device of claim 2, wherein:
the determining whether the first tracked data usage exceeds the first threshold comprises determining whether the first tracked data usage exceeds the first threshold over a predetermined time period; and
the predetermined time period is one of an hour, a day, a week, or a month.

4. The device of claim 1, wherein the first user equipment comprises a smartphone, a cellular telephone, a tablet computer, a laptop computer, or any combination thereof.

5. The device of claim 1, wherein the first reward comprises a first monetary reward.

6. The device of claim 5, wherein the first reward is provided by an operator of a cellular network.

7. The device of claim 1, wherein:
the device comprises one or more servers;
the one or more servers are configured for first communications with one or more first other servers of a first operator of a first cellular network; and
the one or more servers are configured for second communications with one or more second other servers of a second operator of a second cellular network.

8. The device of claim 1, further comprising a database storing a plurality of permanent identifiers of user equipment.

9. The device of claim 8, wherein the correlating further comprises comparing the first temporary identifier that is received to the plurality of permanent identifiers of user equipment that are stored in the database.

10. The device of claim 1, wherein:
the first wireless network comprises a 5G cellular network, a Wi-Fi network, or any combination thereof; and
the first communication between the first user equipment and the first wireless network is via a wireless access point.

11. The device of claim 1, wherein the operations further comprise:

receiving, based upon a second communication between second user equipment and the first wireless network, a second temporary identifier of the second user equipment;

correlating the second temporary identifier to a second permanent identifier of the second user equipment;

tracking a second amount of data that is carried by the first wireless network and that is associated with the second user equipment, resulting in second tracked data usage, wherein the tracking of the second amount is based upon the correlating of the second temporary identifier to the second permanent identifier;

determining whether the second tracked data usage exceeds a second threshold, resulting in a second determination; and responsive to the second determination being that the second tracked data usage does not exceed the second threshold, providing a second reward to the first operator of the first wireless network.

12. The device of claim 11, wherein:

the second temporary identifier comprises another TMSI, another GUTI, or any combination thereof;

the second permanent identifier comprises another IMEI; and the first threshold has a different value than the second threshold.

13. The device of claim 1, wherein the operations further comprise:

receiving, based upon a second communication between second user equipment and a second wireless network, a second temporary identifier of the second user equipment;

correlating the second temporary identifier to a second permanent identifier of the second user equipment;

tracking a second amount of data that is carried by the second wireless network and that is associated with the second user equipment, resulting in second tracked data usage, wherein the tracking of the second amount is based upon the correlating of the second temporary identifier to the second permanent identifier;

determining whether the second tracked data usage exceeds a second threshold, resulting in a second determination; and responsive to the second determination being that the second tracked data usage does not exceed the second threshold, providing a second reward to a second operator of the second wireless network, wherein the second operator is a different operator than the first operator.

14. The device of claim 13, wherein:

the second temporary identifier comprises another TMSI, another GUTI, or any combination thereof; and the second permanent identifier comprises another IMEI.

15. The device of claim 13, wherein the first threshold has a different value than the second threshold.

16. The device of claim 13, wherein:

the first wireless network comprises a first 5G cellular network, a first Wi-Fi network, or any first combination thereof; and the second wireless network comprises a second 5G cellular network, a second Wi-Fi network, or any second combination thereof.

17. A non-transitory machine-readable medium comprising executable instructions that, when executed by a processing system including a processor, facilitate performance of operations, the operations comprising:

obtaining a first temporary identifier of first user equipment that has communicated with a wireless network;

obtaining a second temporary identifier of second user equipment that has communicated with the wireless network;

obtaining data from a database of permanent user equipment identifiers;

matching the first temporary identifier, based upon the data from the database, to a corresponding first permanent identifier of the first user equipment;

determining a first amount of traffic that is carried by the wireless network and that is associated with the first user equipment, resulting in first determined traffic usage, wherein the determining of the first amount is based upon the matching of the first temporary identifier;

determining whether the first determined traffic usage is sufficiently high so as to be a statistical outlier, resulting in a first determination;

responsive to the first determination being that the first determined traffic usage is not sufficiently high so as to be a statistical outlier, facilitating a providing of monetary compensation to an operator of the wireless network for carrying of the first amount of traffic;

matching the second temporary identifier, based upon the data from the database, to a corresponding second permanent identifier of the second user equipment;

determining a second amount of traffic that is carried by the wireless network and that is associated with the second user equipment, resulting in second determined traffic usage, wherein the determining of the second amount is based upon the matching of the second temporary identifier;

determining whether the second determined traffic usage is sufficiently high so as to be the statistical outlier, resulting in a second determination; and responsive to the second determination being that the second determined traffic usage is sufficiently high so as to be the statistical outlier, providing no monetary compensation to the operator of the wireless network for carrying of the second amount of traffic.

18. The non-transitory machine-readable medium of claim 17, wherein:

the first temporary identifier comprises a first TMSI, a first GUTI, or any first combination thereof;

the corresponding first permanent identifier comprises a first IMEI;

the second temporary identifier comprises a second TMSI, a second GUTI, or any second combination thereof;

the corresponding second permanent identifier comprises a second IMEI;

the wireless network comprises a wireless access point;

the first user equipment comprises a first smartphone, a first cellular telephone, a first tablet computer, a first laptop computer, or any third combination thereof; and the second user equipment comprises a second smartphone, a second cellular telephone, a second tablet computer, a second laptop computer, or any fourth combination thereof.

19. A method, comprising:

obtaining, by a processing system including a processor, a first temporary identifier of first user equipment that has communicated with a first wireless network;

obtaining, by the processing system, a second temporary identifier of second user equipment that has communicated with a second wireless network, the second wireless network being distinct from the first wireless network;

obtaining, by the processing system, data from a database comprising permanent user equipment identifiers;

matching, by the processing system, the first temporary identifier to a corresponding first permanent identifier of the first user equipment, wherein the matching of the first temporary identifier is based upon the data from the database;

determining, by the processing system, a first amount of traffic that is carried by the first wireless network and that is associated with the first user equipment, resulting in first tracked traffic usage, wherein the determining of the first amount is based upon the matching of the first temporary identifier;

determining, by the processing system, whether the first tracked traffic usage is sufficiently high so as to be a statistical outlier, resulting in a first determination;

responsive to the first determination being that the first tracked traffic usage is not a statistical outlier, facilitating a providing of monetary compensation to a first operator of the first wireless network for carrying of the first amount of traffic;

matching, by the processing system, the second temporary identifier to a corresponding second permanent identifier of the second user equipment, wherein the matching of the second temporary identifier is based upon the data from the database;

determining, by the processing system, a second amount of traffic that is carried by the second wireless network and that is associated with the second user equipment, resulting in second tracked traffic usage, wherein the determining of the second amount is based upon the matching of the second temporary identifier;

determining, by the processing system, whether the second tracked traffic usage is sufficiently high so as to be the statistical outlier, resulting in a second determination; and responsive to the second determination being that the second tracked traffic usage is a statistical outlier, providing no monetary compensation to a second operator of the second wireless network for carrying of the second amount of traffic.

20. The method of claim 19, wherein:

the determining whether the first tracked traffic usage is sufficiently high so as to be a statistical outlier comprises determining whether the first tracked traffic usage is greater, by a first predetermined amount, than a first average amount of traffic used by all first other user equipment on the first wireless network over a first time period; and the determining whether the second tracked traffic usage is sufficiently high so as to be a statistical outlier comprises determining whether the second tracked traffic usage is greater, by a second predetermined amount, than a second average amount of traffic used by all second other user equipment on the second wireless network over a second time period.

* * * * *